(12) United States Patent
Karlsson et al.

(10) Patent No.: US 8,743,839 B2
(45) Date of Patent: Jun. 3, 2014

(54) SCHEDULING DIFFERENT TYPES OF RECEIVERS IN A RADIO BASE STATION

(75) Inventors: Patrik Karlsson, Stockholm (SE); Torbjorn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 84 days.

(21) Appl. No.: 13/379,474

(22) PCT Filed: Jul. 1, 2009

(86) PCT No.: PCT/SE2009/050850
§ 371 (c)(1),
(2), (4) Date: Dec. 20, 2011

(87) PCT Pub. No.: WO2011/002364
PCT Pub. Date: Jan. 6, 2011

(65) Prior Publication Data
US 2012/0099621 A1    Apr. 26, 2012

(51) Int. Cl.
*H04W 4/00* (2009.01)
(52) U.S. Cl.
USPC .......................................................... 370/334
(58) Field of Classification Search
USPC ......... 370/328, 329, 330, 332, 334, 430, 437, 370/252, 278, 335, 390; 455/561, 13.3
See application file for complete search history.

(56) References Cited

U.S. PATENT DOCUMENTS

| 2005/0088988 A1* | 4/2005 | Kwon et al. ................... 370/328 |
| 2005/0152265 A1* | 7/2005 | Denk ............................ 370/209 |
| 2006/0034352 A1 | 2/2006 | Sampath et al. |
| 2006/0121946 A1* | 6/2006 | Walton et al. ................. 455/561 |
| 2006/0146755 A1* | 7/2006 | Pan et al. ...................... 370/334 |
| 2007/0147370 A1* | 6/2007 | Hasegawa ..................... 370/390 |
| 2007/0165576 A1* | 7/2007 | Wang et al. ................... 370/335 |
| 2007/0211660 A1* | 9/2007 | Teague .......................... 370/329 |
| 2008/0107046 A1* | 5/2008 | Kangasmaa et al. .......... 370/278 |
| 2008/0240021 A1* | 10/2008 | Guo et al. ...................... 370/328 |
| 2009/0129286 A1* | 5/2009 | Beser ............................ 370/252 |
| 2010/0177725 A1* | 7/2010 | van Rensburg ............... 370/329 |

FOREIGN PATENT DOCUMENTS

| WO | 2005066587 A1 | 7/2005 |
| WO | 2007051087 A2 | 5/2007 |
| WO | 2007124112 A2 | 11/2007 |

* cited by examiner

*Primary Examiner* — Anh-Vu Ly
*Assistant Examiner* — Gustavo Lopez-Vargas
(74) *Attorney, Agent, or Firm* — Rothwell, Figg, Ernst & Manbeck, P.C.

(57) ABSTRACT

The invention relates to a method in a radio base station (110) of a radio telecommunications network (100), wherein the radio base station (110) comprises at least two different types of receivers; a first type of receivers and a second type of receivers. The first type of receivers comprises a different receiving sensitivity than the second type of receivers. The method is for scheduling a first type of receiver to a user equipment (120) within a radio cell (115) served by the radio base station (110). The radio base station determines a distance (125) between the user equipment (120) and a radio cell boundary (127) of the radio cell (115), and schedules the first type of receiver to the user equipment (120) when the distance is determined to be within a distance range.

16 Claims, 14 Drawing Sheets

SCHEDULING DIFFERENT TYPES OF RECEIVERS IN A RADIO BASE STATION

CROSS-REFERENCE TO RELATED APPLICATION

This application is a 35 U.S.C. §371 National Phase Entry Application from PCT/SE2009/050850, filed Jul. 1, 2009, and designating the United States.

TECHNICAL FIELD

Embodiments herein relate to in general, a method and an arrangement in a radio base station and a method and an arrangement in a network node. In particular, embodiments herein relate to scheduling a type of receiver to a user equipment within a radio cell in a radio telecommunications network.

BACKGROUND

Mobile broadband in radio telecommunications systems is today becoming increasingly important, e.g. for operators running Wideband Code Division Multiple Access (WCDMA) cellular systems. To enhance system capacity and optimize bit rates, new receiver technologies with advanced receivers in radio base stations are currently being introduced in the WCDMA uplink. These advanced receivers are capable of interference cancellation thereby have higher receiving sensitivity to user equipment (UE). Interference cancellation is a signal processing technology that reduces the amount of interference experienced at the decoding step of a receiver. Two such interference cancellation techniques are described briefly below, these being the whitening GRAKE+ receiver and conventional successive interference cancellation. A more advanced version denoted multi-user detection, performs these operations in parallel between several or all users, this creating an enormously complicated joint estimation and detection problem. For this reason true multi user detection is not attempted in the WCDMA uplink.

In the WCDMA uplink all users transmit on the whole frequency band, thereby achieving frequency diversity gains. The transmissions are allocated to a set of codes, known at the receiver. Each user may use one or more codes for the uplink transmission. This is similar to all direct sequence spread spectrum communication systems. During transmission the signal is affected by the channel which is normally modeled as a time varying finite impulse filter with taps being denoted the channel gains.

In WCDMA a so called RAKE receiver first correlates the received signal with each candidate transmitted sequence, using the codes. This may be interpreted in terms of both correlation and matched filtering. In the next step, the result is combined with the estimated channel model using a second correlation/matched filtering/inner product operation. The channel gain corresponding to a certain filter tap is normally denoted a finger of the RAKE receiver. Following these steps symbol detection can take place.

Since all UEs transmit in the whole uplink frequency band simultaneously, the other users create interference that affect the detection performance of each specific user/UE negatively. To counter this effect, conventional interference cancellation (IC) may be used in receivers of the radio base station. This technology aims at reducing the interference experienced of each specific user.

A first problem with today's uplink receiver solutions is that there are not enough receiver resources to provide all users with the most advanced receivers of the radio base station. A first consequence is a desire to schedule less advanced receivers, such as RAKE and GRAKE receivers, and receivers with higher receiving sensitivity, such as GRAKE+ receivers, in a way that optimizes the uplink performance, as measured in e.g. dropped call rate and radio cell throughput.

Another problem is then to find/design the principles provide receivers to optimize the uplink performance and a furthermore problem is associated with defining the means to implement said principles for scheduling between advanced and less advanced receiver types.

SUMMARY

There is an object of embodiments herein to provide methods and arrangements to efficiently use radio resources within a radio telecommunications network in an optimal manner.

According to a first aspect, the object is achieved by a method in a radio base station for scheduling a receiver of a first type to a user equipment within a radio cell served by the radio base station. The radio base station is comprised in a radio telecommunications network. The radio base station comprises at least two different types of receivers; the first type of receivers and a second type of receivers. The first type of receivers comprises a receiver with a different receiving sensitivity than a receiver of the second type of receivers. The radio base station determines a distance between the user equipment and a radio cell boundary of the radio cell. The radio base station then schedules the receiver of the first type of receivers to the user equipment when the distance is determined to be within a distance range.

According to a second aspect, the object is achieved by an arrangement in the radio base station. The arrangement comprises a determining unit arranged to determine the distance between the user equipment and the radio cell boundary of the radio cell served by the radio base station. The arrangement further comprises a scheduling unit arranged to schedule the receiver of the first type of receivers to the user equipment when the distance is within the distance range.

According to a third aspect, the object is achieved by a method in a network node for assisting in scheduling in the radio base station, the receiver of the first type of receivers to the user equipment. The network node, such as a radio network controller, a positioning node, or a different radio base station, is comprised in the radio telecommunications network. The network node signals to the radio base station, an indicator indicating the distance between the user equipment and the radio cell boundary of a radio cell served by the radio base station. The distance is to be used when scheduling the receiver of the first type of receiver to the user equipment. The network node further signals an identity of the user equipment to the radio base station.

According to a fourth aspect, the object is achieved by an arrangement in the network node. The arrangement comprises signaling unit arranged to signal the indicator indicating the distance between the user equipment and the radio cell boundary of the radio cell served by the radio base station.

An advantage of the present technique includes an improved performance of the WCDMA uplink, in terms of reduced dropped call rate, coverage and/or system throughput. The improvement is being associated with the accounting for the position of user equipments relative the radio cell boundary.

Embodiments herein disclose scheduling methods based on the transmitted power of the uplink users indicated by the user equipment to the radio base station, wherein the scheduling of the receivers with higher receiving sensitivity is performed to users that are close to the maximum transmission power. The scheduling of the receivers with, for example, higher receiving sensitivity may also be based on position information, said position information comprising the measured position of at least a subset of all users and the geographical model of the radio cell boundary to determine position relative the radio cell boundary.

Embodiments herein disclose means for signaling of position information from a network node, such as a radio network controller (RNC) node, to the radio base station to implement said principles for scheduling between receiver types of different receiving sensitivity to user equipments.

BRIEF DESCRIPTION OF THE DRAWINGS

Embodiments will now be described in more detail in relation to the enclosed drawings, in which.

DETAILED DESCRIPTION

Figure 1:
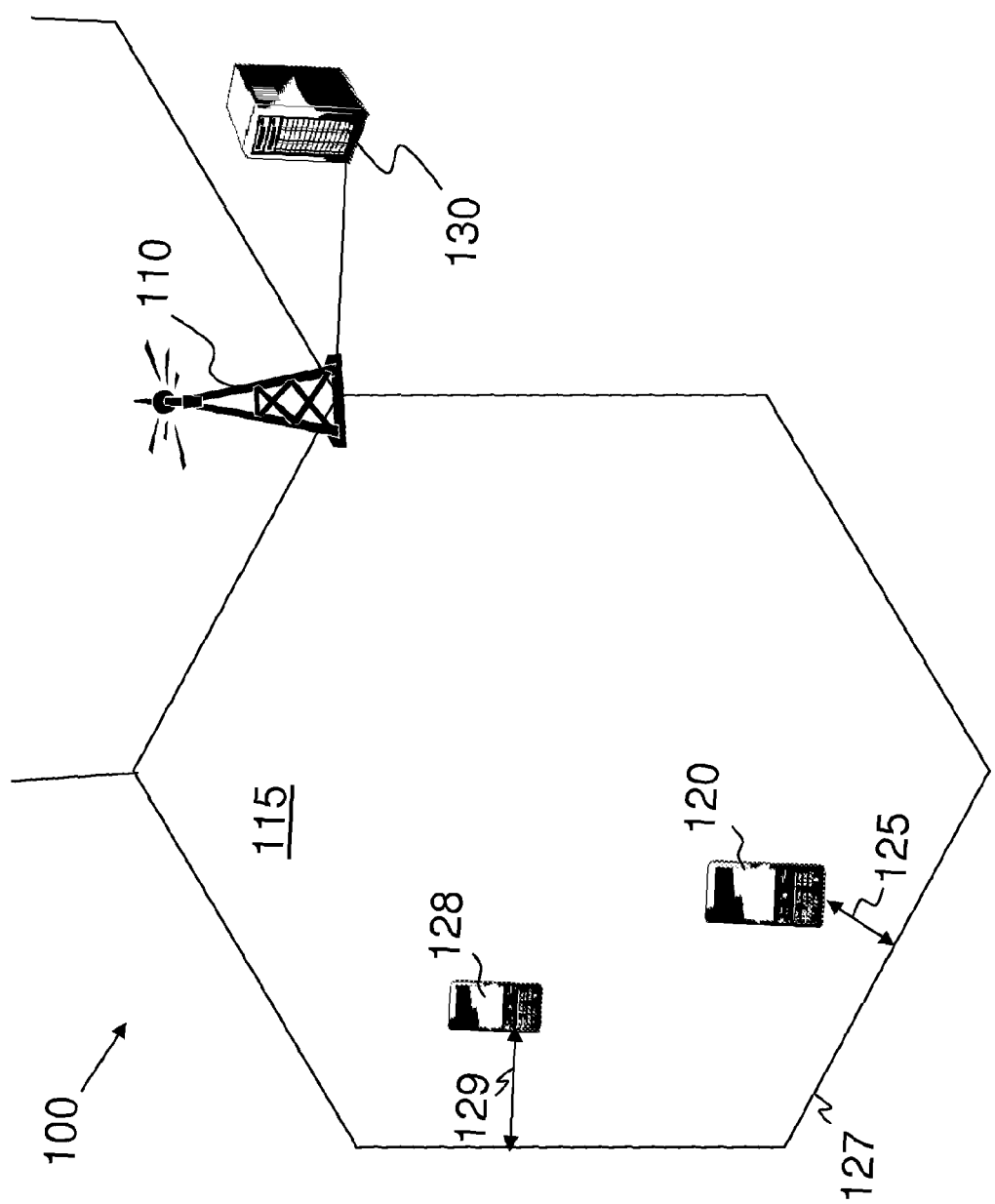
FIG. 1 shows a schematic overview of a radio telecommunications network.

In FIG. 1, a schematic overview of an exemplary embodiment of a radio telecommunications network 100 is shown. The radio telecommunications network may comprise an Evolved Packet System (EPS). However, it should be noted that other radio telecommunications networks may be used, such as Wideband Code Division Multiple Access (WCDMA), and/or the like.

The radio telecommunications network 100 comprises a radio base station 110 serving a radio cell 115. The radio base station 110 may be represented by a NodeB, an eNodeB, or any other network unit capable of communicating over a radio carrier with a UE 120 being present in the radio cell 115. The UE 120 is positioned a distance 125 from a radio cell boundary 127; the radio cell boundary 127 being the part of the radio cell boundary closest to the UE 120.

The UE 120 is served by the radio base station 110, and is therefore capable of communicating with the radio base station 110 over a radio carrier. A second UE 128 is positioned in the in the radio cell 115 associated with a distance 129 to the cell boundary 127.

The radio base station 110 comprises at least two different types of receivers; a first type of receivers and a second type of receivers. The first type of receivers comprises a receiver with a different receiving sensitivity to UEs. In the example, the first type comprises a receiver with higher receiving sensitivity. The radio base station 110 is further arranged to schedule these different types of receivers to different UEs. By basing the scheduling decision on how close the UE 120 is to the radio cell boundary 127 of the radio cell 115, the radio telecommunications network will obtain a better performance with less dropped calls and higher through put. The higher receiving sensitivity may be achieved by a receiver comprising interference cancellation.

The radio base station 110 may calculate the distance 125 between the UE 120 and the radio cell boundary 127 in order to determine how close the UE 120 is the radio cell boundary 127. As an alternative the radio base station 110 may receive data indicating the distance 125 from a network node 130, such as a radio network controller, a positioning node, another radio base station and/or the like. As another alternative, the radio base station 110 may determine the distance 125 to the radio cell boundary by a power indicator from the UE 120 indicating the distance 125 to the radio cell boundary 127.

A parameter, to be used to determine whether a UE should be scheduled a receiver with higher sensitivity to Ues, is defined as the distance 125 of a position of the UE 120 relative the radio cell boundary 127. The scheduling of the receivers with higher receiving sensitivity to the UE 120 is performed when the UE 120 is within a distance range of the radio cell boundary 127.

The distance range may be determined by a sorted list stored at the radio base station 110. The sorted list comprises the first UE 120 together with its distance 125 to the radio cell boundary 127 and the second UE 128 together with its distance 129 to the radio cell boundary 127. The sorted list indicates which UE is closest to the radio cell boundary 127. This sorted list may be used to schedule UEs being closest the radio cell boundary 127. For example, the radio base station 110 comprises ten receivers with higher receiving sensitivity and it is determined that the UE 120 is positioned a distance of 200 meters from the radio cell boundary 127 of the radio cell 115. The UE 120 may be scheduled a receiver with higher receiving sensitivity if there are less than ten UEs within the radio cell 115 positioned 200 meters from the radio cell boundary 127. However, if there are fifteen UEs within a distance of 200 meters to the radio cell boundary 127 the UE 120 will be scheduled a receiver of less receiving sensitivity.

The distance range may also be predetermined with a preset distance value. For example, the distance range may be set to 150 meters and all UEs that are positioned 150 meters from the radio cell boundary 127 will be scheduled a receiver with higher receiving sensitivity Embodiments herein schedule the receivers with the highest receiving sensitivity to UEs at or close the radio cell boundary 127. Thereby, receivers of higher receiving sensitivity will be scheduled to UEs more in need of such receivers, due to the inability of further power ups at said radio cell boundary 127. The receiving sensitivity may be achieved by interference cancellation capabilities of these receivers that improve the link budged, which e.g. reduces the amount of dropped calls. A feature of some embodiments is the observation that positioning technology or measurement of the transmitted power of the UE can be used to aid this scheduling, in particular since the transmitted power is subject to fading that can be quite large. The system performance is thereby optimized with regards to the geographical location of UEs in an uplink cell.

Figure 2:
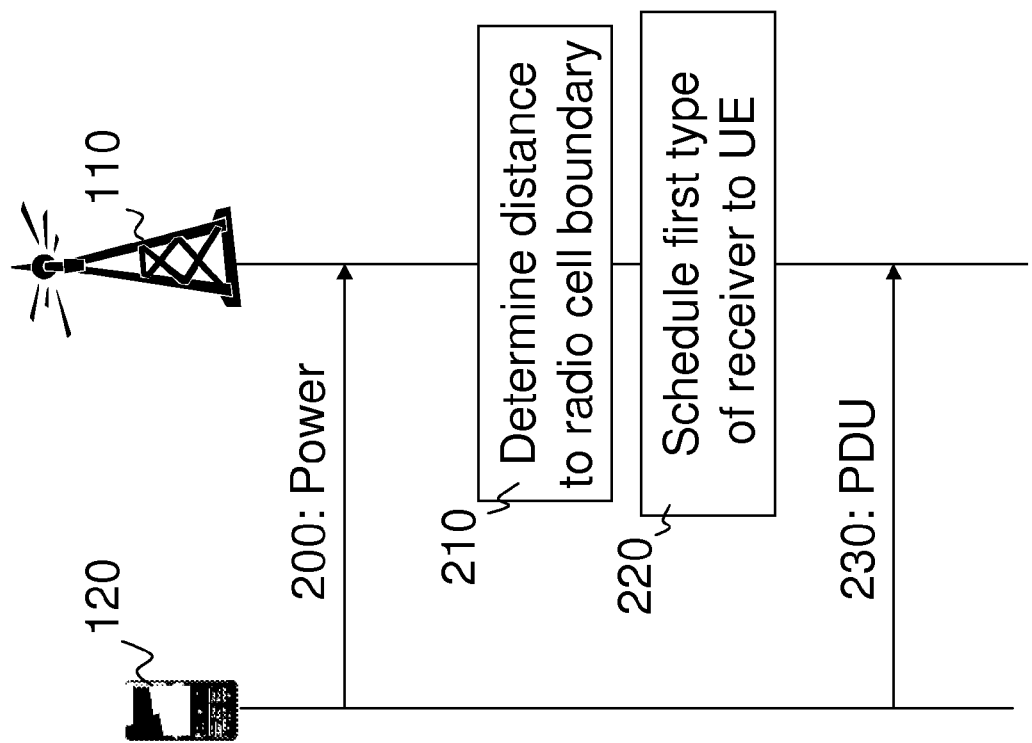
FIG. 2 shows a schematic combined method and signalling scheme in a radio telecommunications network.

FIG. 2 is a combined signaling scheme and flowchart depicting embodiments of the present solution. The radio base station 110 comprises a first type of receivers and a second type of receivers. The first type of receivers comprises a receiver with higher receiving sensitivity to UEs than a receiver of the second type of receivers. The method steps do not have to be taken in the order stated below, but may be taken in any suitable order.

In step 200, the UE 120 transmits an indication of transmitted power as well as an indication how close the transmitted power is a maximum transmitted power to the radio base station 110.

In step 210, the radio base station 110 determines an indicated distance between the position of the UE 120 and the radio cell boundary 127 based on the received indication of transmitted power.

In step 220, when the distance is within a distance range, the base station 110 schedules a receiver of the first type of receivers to the UE 120. The distance range may be dynamically determined by sorting UEs within the radio cell of the radio base station according to the respective distance between each UE and the radio cell boundary 127. The receivers of the first type of receivers are then scheduled to a predetermined number of UEs in the list with the smallest distance. The predetermined number is generally the number of first type receivers available in the radio base station 110. The distance range is then dynamically determined to be shorter than or equal to the distance of the UE last of the predetermined number of UEs in the sorted list. The distance range may also be predetermined as a preset distance value indicating a distance to the radio cell boundary 127, a distance at which a UE requires a first type of receiver to uphold a certain communication performance. The first type of receivers comprises a higher receiving sensitivity to UEs, by for example, being capable of interference cancellation.

In step 230, the UE 120 being within the distance range to the radio cell boundary 127 of the radio cell 115, transmits packet data units (PDUs) to the radio base station 110. This is performed without the connection being dropped since the radio base station 110 has scheduled a receiver capable of receiving a signal from a UE being close, that is within the distance range, to the radio cell boundary 127.

Figure 3:
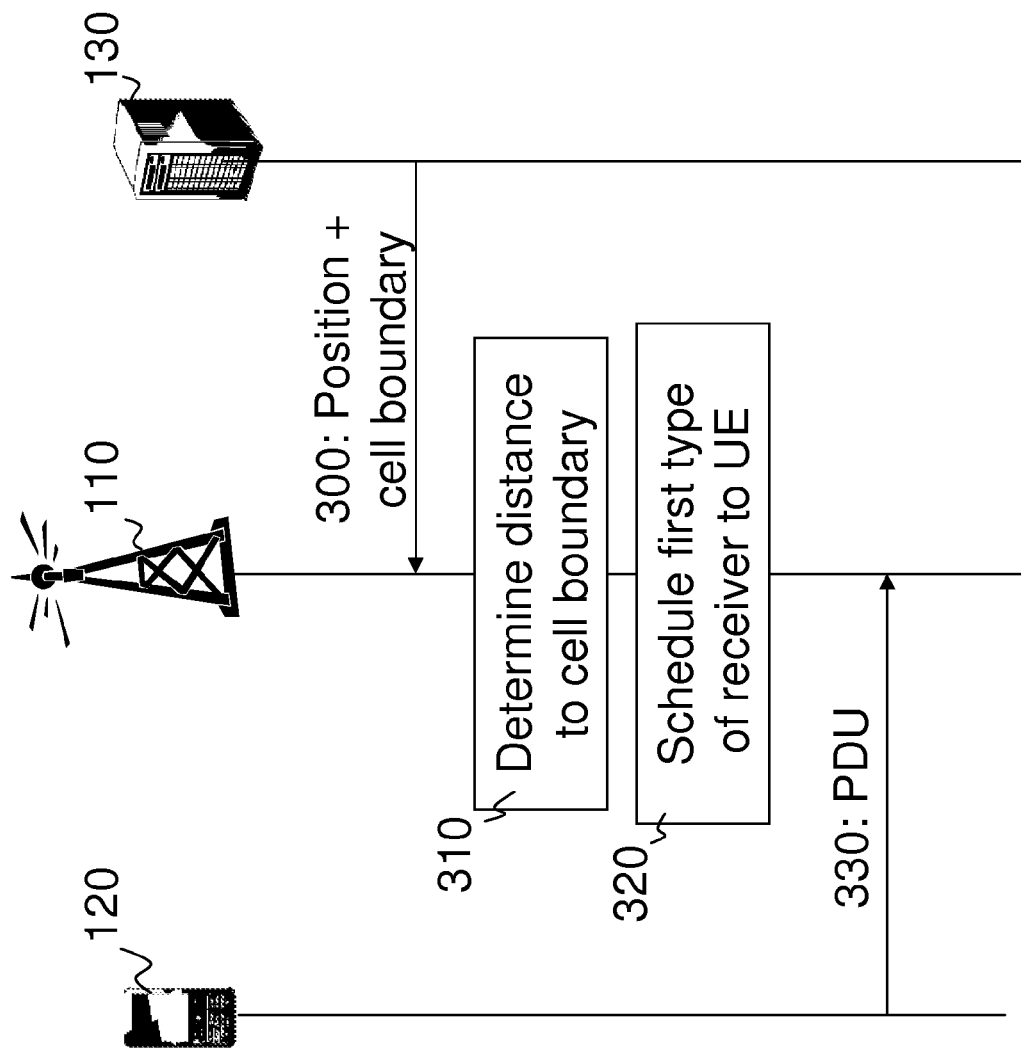
FIG. 3 shows a schematic combined method and signalling scheme in a radio telecommunications network.

FIG. 3 is a combined signaling scheme and flowchart depicting further embodiments of the present solution. The method steps do not have to be taken in the order stated below, but may be taken in any suitable order.

In step 300, the network node 130 transmits to the radio base station 110, an indication of the position of the UE 120 and/or a location of the radio cell boundary 127. The network node 130 may also transmit an identity of the UE 120 for the radio base station 110 to identify the UE 120. The network node 130 may comprise a controller node.

In step 310, the radio base station 110 determines a distance 125 between the UE 120 and the radio cell boundary 127 based on the received position of the UE 120 and the location of the radio cell boundary 127. The location of the radio cell boundary may be known or, as illustrated in the FIG. 3, received from the network node 130.

In step 320, the radio base station 110 schedules a receiver with higher receiving sensitivity to radio signals from Ues, to the UE 120 if the distance 125 is within a distance range. The step 320 in FIG. 3 corresponds to step 220 in FIG. 2.

In step 330, the UE 120 being close to the radio cell boundary 127 of the radio cell 115 transmits packet data units (PDUs) to the radio base station 110 without the connection being dropped. The step 330 in FIG. 3 corresponds to step 230 in FIG. 2.

Figure 4:
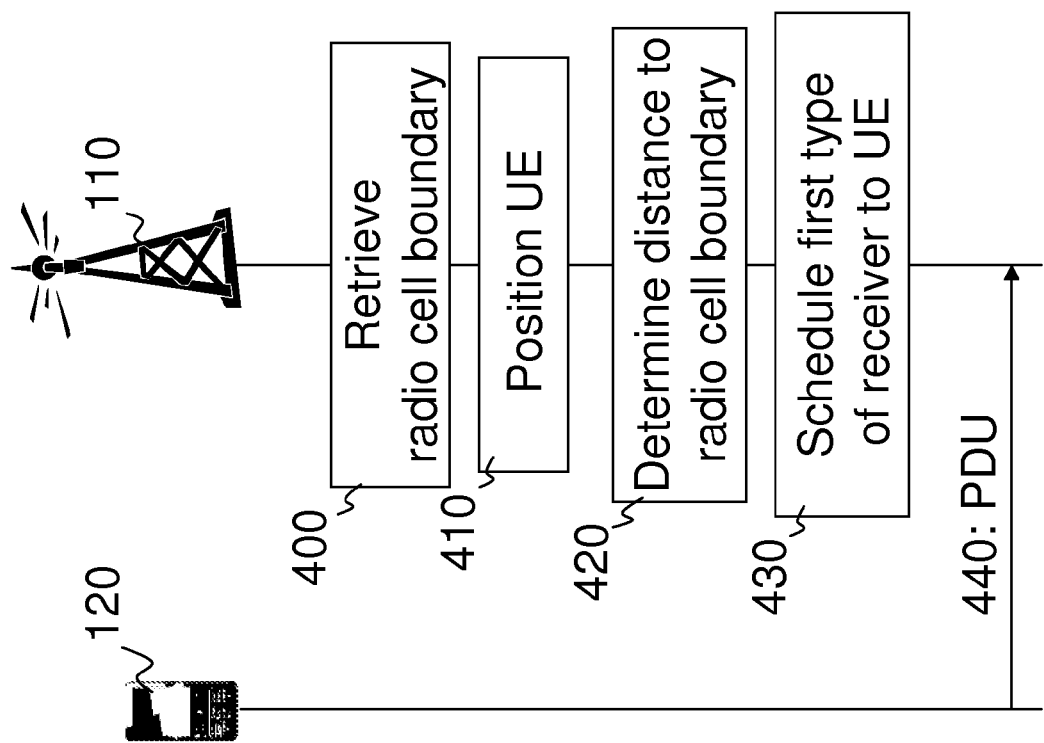
FIG. 4 shows a schematic combined method and signalling scheme in a radio telecommunications network.

FIG. 4 is a combined signaling scheme and flowchart depicting further embodiments of the present solution. The method steps do not have to be taken in the order stated below, but may be taken in any suitable order.

In step 400, the radio base station 110 retrieves from a configurable memory the location of the radio cell boundary 127. Radio cell boundaries are described by radio cell polygons in WCDMA, these radio cell polygons being standardized to hold three-fifteen corners, where each corner consist of a latitude longitude pair. These latitude longitude corners may then be transformed to a local Cartesian coordinate system, this system being tangential to the earth ellipsoid.

In step 410, the radio base station positions the UE 120 within the radio cell 115 based on measured signals, transmitted power, received positional information and/or the like.

In step 420, the radio base station 110 determines the distance 125 between the UE 120 and the radio cell boundary 127 of the radio cell 115 based on the retrieved location of the radio cell boundary 127 and the position of the UE 120.

In step 430, the radio base station 110 schedules a receiver with higher receiving sensitivity to radio signal from UEs to the UE 120 if the distance 125 is within a distance range.

In step 440, the UE 120 being close to the radio cell boundary 127 of the radio cell 115, that is, within the distance range, transmits packet data units (PDUs) to the radio base station 110 without the connection being dropped.

Figure 5:
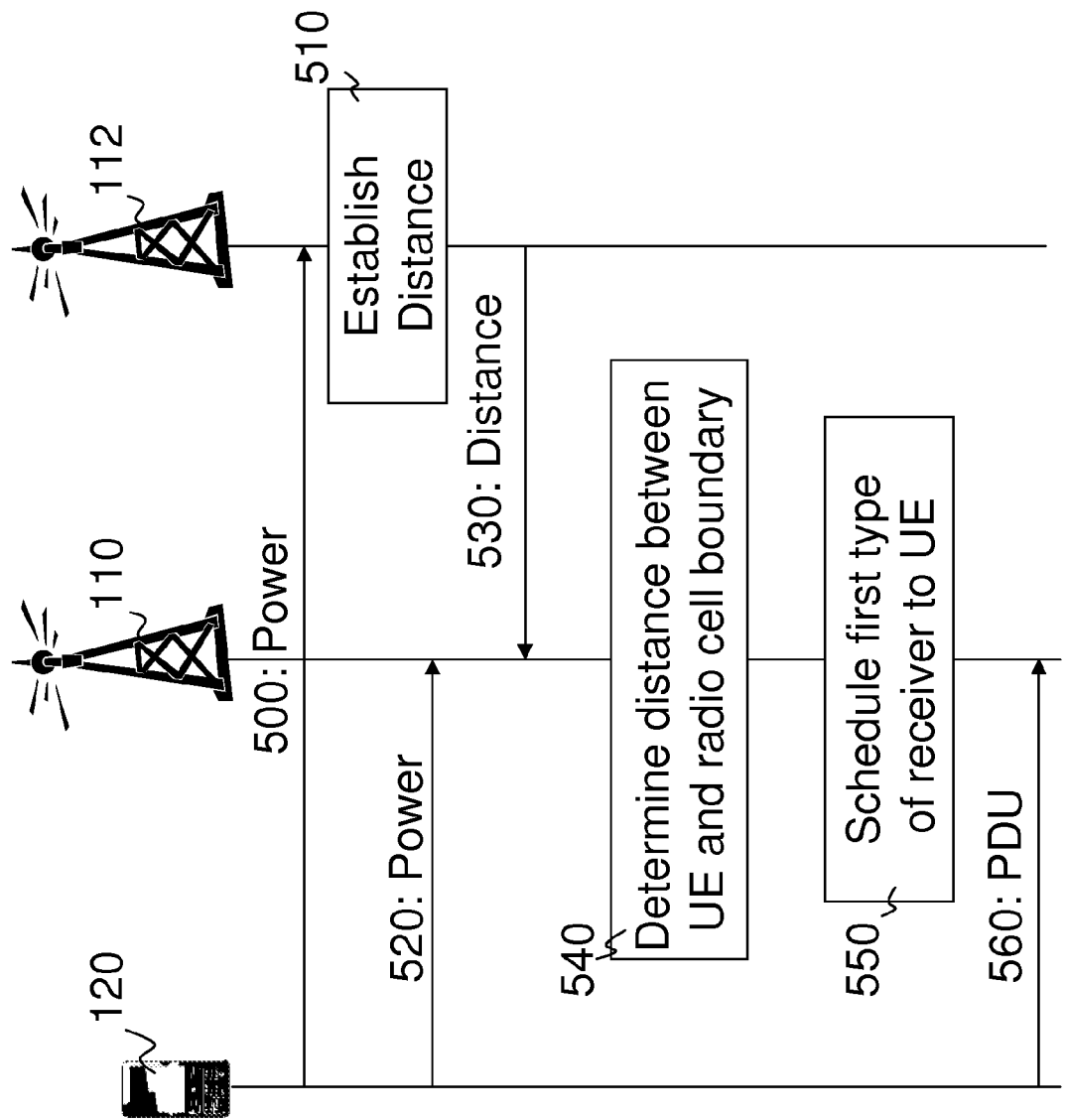
FIG. 5 shows a schematic combined method and signalling scheme in a radio telecommunications network.

FIG. 5 is a combined signaling scheme and flowchart depicting further embodiments of the present solution. The method steps do not have to be taken in the order stated below, but may be taken in any suitable order.

In step 500, the UE 120 transmits an indication of transmitted power as well as an indication how close the transmitted power is a maximum transmitted power. The indication is transmitted to and received at the network node 130 being in the illustrated example a different base station 112.

In step 510, the different base station 112 establishes an indicated distance between the UE 120 and the radio cell boundary 127 based on the received indication of transmitted power from the UE 120.

In step 520, the UE 120 transmits an indication of transmitted power as well as an indication how close the transmitted power is a maximum transmitted power. The indication is transmitted to and received at the radio base station 110.

In step 530, the different radio base station 112 transmits the indicated distance to the radio base station 110. The different radio base station 112 may also transmit an identity of the UE 120 enabling the radio base station 110 to associate the indicated distance to the UE 120.

In step 540, the radio base station 110 determines the distance 125 between the UE 120 and the radio cell boundary 127 based on the received indication of transmitted power of the UE 120 as well as the received indicated distance from the different radio base station 112.

In step 550, when the distance is within a distance range of the radio cell boundary 127 the base station 110 schedules a first type of receivers comprising a higher receiving sensitivity to the UE 120. The step 550 in FIG. 5 corresponds to step 430 in FIG. 4.

In step 560, the UE 120, being within the distance range to the radio cell boundary 127 of the radio cell 115, transmits packet data units (PDUs) to the radio base station 110 without the connection being dropped. The step 560 in FIG. 5 corresponds to step 440 in FIG. 4.

Figure 6:
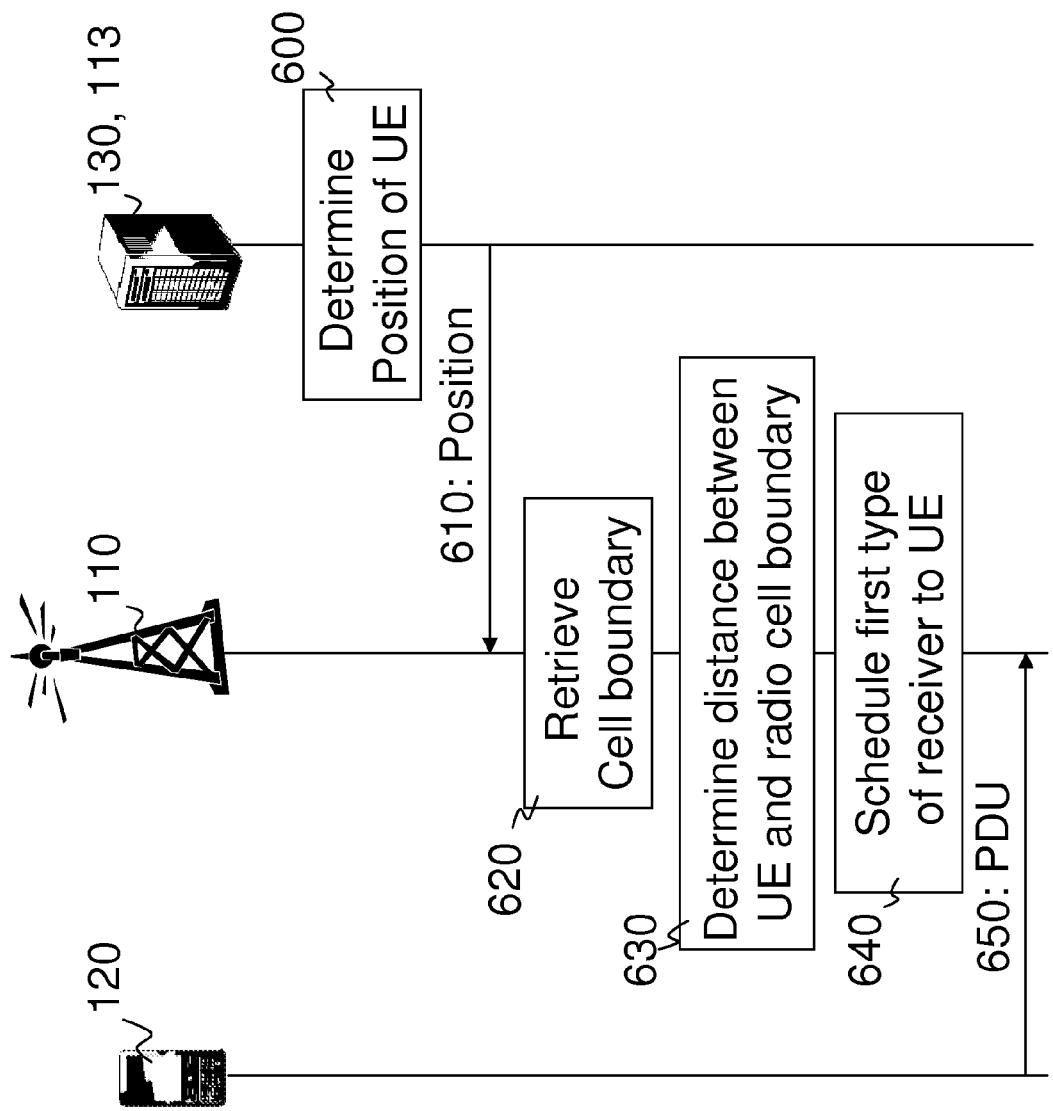
FIG. 6 shows a schematic combined method and signalling scheme in a radio telecommunications network.

FIG. 6 is a combined signaling scheme and flowchart depicting further embodiments of the present solution. The method steps do not have to be taken in the order stated below, but may be taken in any suitable order.

In step 600, the network node 130 determines a position of the UE 120. For example, in the illustrated example the network node 130 comprises a positioning node 113 in the LTE. The positioning node 113 comprises positioning information of the UE 120.

In step 610, the positioning node 113 transmits to the base station 110, the position of the UE 120 and/or a location of the radio cell boundary 127 of the radio cell 115. The positioning node 113 may also transmit an identity of the UE 120.

In step 620, the radio base station 110 retrieves the location of the radio cell boundary 127 from a configurable memory or received from the positioning node 113. The location of the radio cell boundary 127 may be defined by an algorithm.

In step 630, the radio base station 110 determines the distance 125 between the position of the UE 120 and the radio cell boundary 127. The radio cell boundary 127 may be retrieved in the radio base station 110, as stated in step 620, or received from the positioning node 113.

In step 640, when the distance 125 is within a distance range of the radio cell boundary 127 the base station 110 schedules a first type of receivers comprising a higher receiving sensitivity to the UE 120. The step 640 in FIG. 6 corresponds to step 550 in FIG. 5.

In step 650, the UE 120 being within the distance range to the radio cell boundary 127 of the radio cell 115 transmits packet data units (PDUs) to the radio base station 110 without the connection being dropped. The step 650 in FIG. 6 corresponds to step 560 in FIG. 5.

The above mentioned examples result, as stated above, in that the radio resources within the network node is used in a more efficient manner. FIGS. 4-6 may for example be performed within a Long Term Evolution system, whereas FIGS. 2-3 may be performed also in a WCDMA system.

Figure 7:
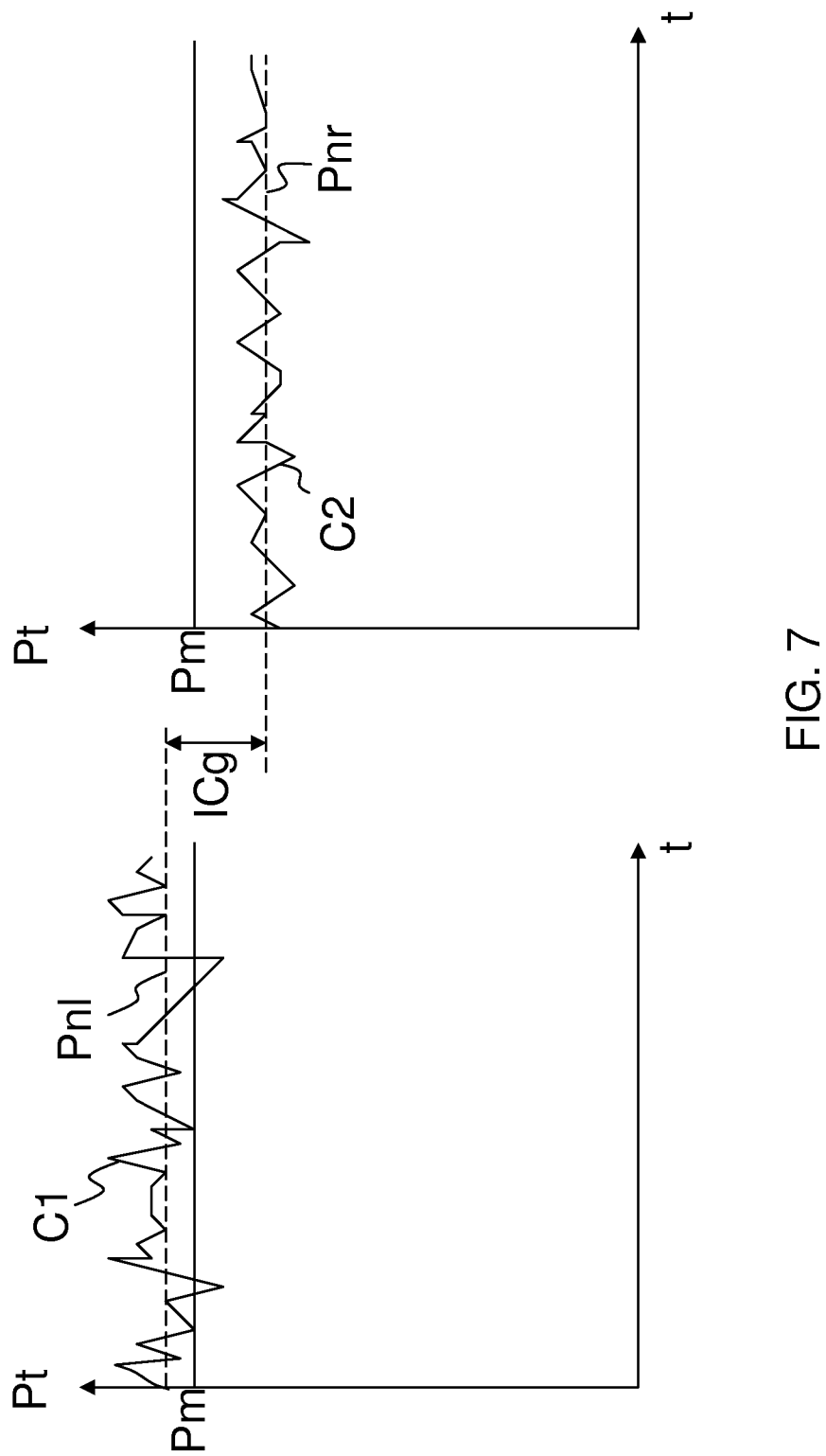
FIG. 7 shows plots of transmitted power of a UE using an IC receiver and not using IC receivers at the base station.

FIG. 7 illustrates the gain of interference cancellation at the radio cell boundary 127 in a left plot compared to a right plot. Each plot has transmitted power Pt along the y-axis and time t along the x-axis. The situation at the radio cell boundary 127 i.e. where further power up of the UE 120 is not possible, is illustrated in FIG. 7.

A maximum power Pm is marked in each plot and the left plot shows a situation where the transmitting UE 120 has not been scheduled with a receiver capable of interference cancellation. As a consequence, the radio base station 110 will order the UE 120 to transmit on a power exceeding the maximum power, in order for the transmission to get through. This is shown as a curve C1 of needed transmitted power exceeds the Pm line. This is however not possible since the commanded power in this case exceeds the maximum power Pm of the UE 120. An average of the needed transmitted power is marked as a dashed line denoted as Pnl in the left plot.

In the right plot, an interference cancellation receiver is scheduled, such as a GRAKE+ receiver; to the UE 120. As a result the radio base station 110 does not need to command as high power. This results in that the ordered transmit power, shown as curve C2 of needed transmitted power, remains below the maximum power Pm available to the UE 120. An average of the needed transmitted power is marked as a dashed line denoted as Pnr in the right plot. In both cases it is assumed that the radio base station 110 power control loop is run to maintain a certain signal quality level, or power, as seen in the radio base station receiver. An Interference Cancellation gain ICg is denoted in the FIG. 7 disclosing the gain of needed transmitted power using a receiver of the radio base station 110 with an interference cancellation function.

The transmission quality would be very poor in the situation depicted in the left plot, possibly resulting in a dropped call. The situation in the right plot would however maintain the UE 120 within normal operating limits. This example shows that it is desirable to allocate receivers with higher receiving sensitivity at the radio base station 110 to users at or close to the radio cell boundary 127, in situations where the availability of such advanced receivers is limited.

The distance 125 of the position of the UE 120 relative the radio cell boundary 127 may be determined based on the transmitted power of the UE 120. In FIG. 7 the transmit power of the UE 120 was used for illustrative purposes. This quantity, which can be signaled from the UE 120 to the radio base station 110 and the radio network controller RNC in WCDMA cellular systems, offers one possible way to control the scheduling operation. When a rescheduling of receiver resources is made, e.g. periodically or when a new user is about to attach to the radio base station 110 serving the radio cell, the transmit power of all existing users may be collected. It is then possible for the scheduler to rank the UEs in terms of transmit power, and to make a joint scheduling decision also based on other factors like the bit rate grant and similar. The scheduling decision would then be based on a measure like $$\Delta P_u = P_m - P_u, u=1, \ldots, U, \tag{1}$$

where $\Delta P_M$ is the transmit margin, with respect to maximum transmit power of user u,
U is the number of users,
$P_m$ is the maximum transmit power and where $P_u$ is the transmit power, as measured in UE u and signaled to the radio base station 110.

The distance 125 of the UE 120 to the radio cell boundary 127 may be based on position information and radio cell boundary 127 information. Mathematically, the radio cell boundary 127 can be described as a closed curve q which does not intersect itself, i.e. as $$q = q_{cell}(t), t \in [t_0, t_1], q_{cell}(t_1) = q_{cell}(t_0). \tag{2}$$

Here t is the parameter of the curve. UE positioning applies various technologies in order to determine the position of a UE, expressed in universally valid coordinates according to, for example, the World Geodetic System (WGS) 84 reference coordinate system. Common such methods include radio cell ID positioning, round trip time (RTT) positioning, fingerprinting positioning as well as the industry standard assisted GPS (A-GPS). Currently, with the emergence of A-GPS capable radio cell phones, commercial applications are expected to emerge at a larger scale. Such applications include e.g. personal navigation, friend and service finding and gaming applications.

Assisted GPS (A-GPS) positioning is an enhancement of the global positioning system (GPS). There are GPS reference receivers attached to e.g. a cellular communication system that collect assistance data that, when transmitted to GPS receivers in UEs connected to the radio cellular communication system, enhance the performance of the GPS UE receivers. Typically, A-GPS accuracy can become as good as 10 meters also without differential operation. The accuracy becomes worse in dense urban areas and indoors, where the sensitivity is most often not high enough for detection of the very weak signals from the GPS satellites.

Figure 8:
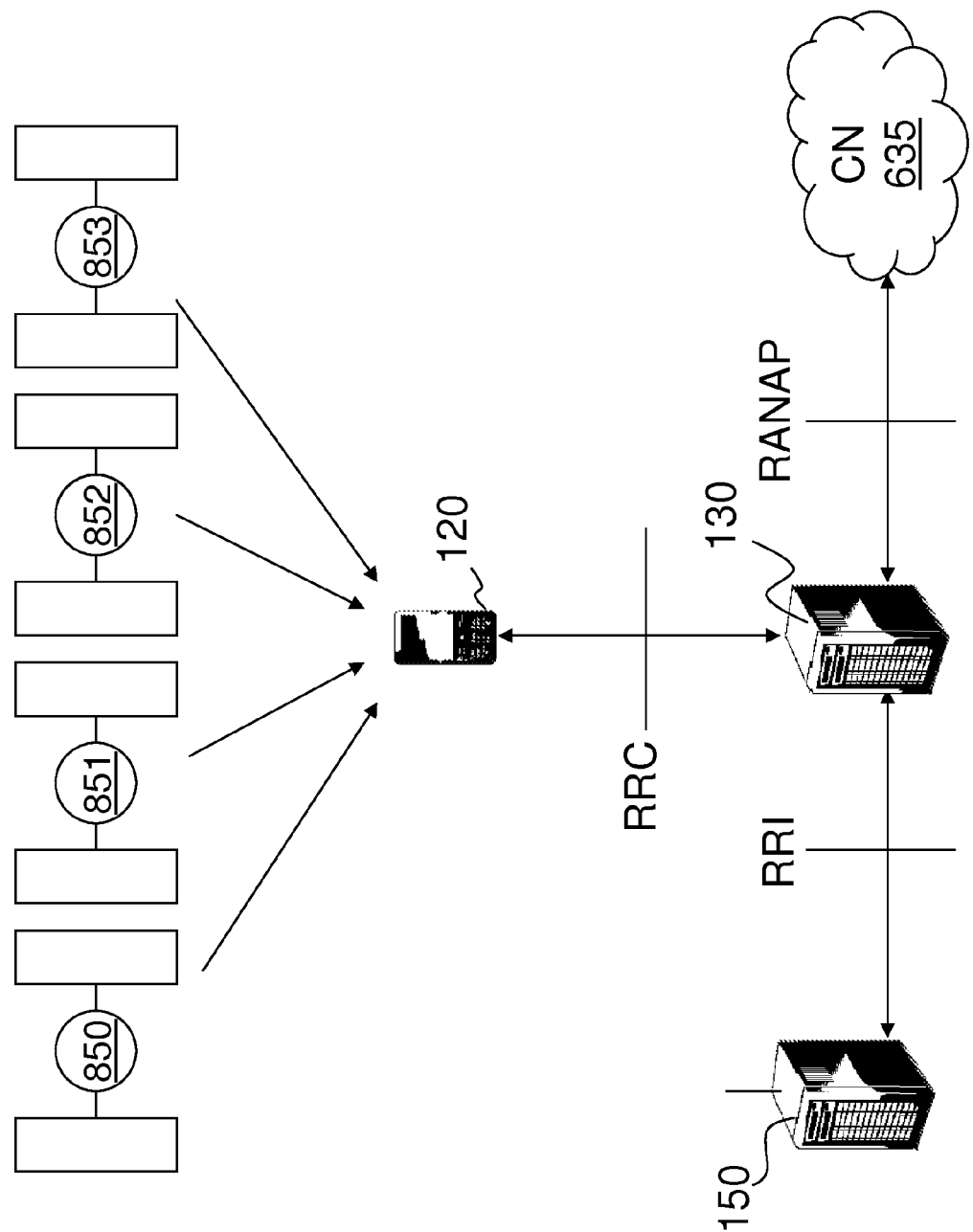
FIG. 8 shows a schematic overview of positioning a UE using an assisted GPS technique.

An example of A-GPS implemented in a cellular communication system, in this case a WCDMA system, is shown in FIG. 8. In FIG. 8, the UE 120 comprises a GPS receiver arranged to receive GPS ranging signals from a number of satellites 850-853 to position the UE 120. A positioning request from Core Network (CN) 135 is received over a Radio Access Network Application Part (RANAP) interface at the network node 130, such as an RNC. A reference GPS receiver 160 is arranged to provide assistance data to position the UE 120 to the network node 130 over a Reference Receiver Interface, RRI. From the network node 130, measurement orders and assistance data are transmitted to the UE 120 via the base station over a Radio Resource Control (RRC) interface to aid in positioning the UE 120. Thus, an improved GPS technique is achieved to position the UE 120.

Another positioning technique is a radio cell ID positioning method. The radio cell ID positioning method determines the location of the UE 120 with radio cell granularity, by association of the radio cell ID to a geographical description of the radio cell. In WCDMA a polygon with three-fifteen corners is used for this purpose. This radio cell description may be used when determining if the radio cellular UE 120 is within the distance 125 between the UE 120 and the radio cell boundary 127.

Figure 9:
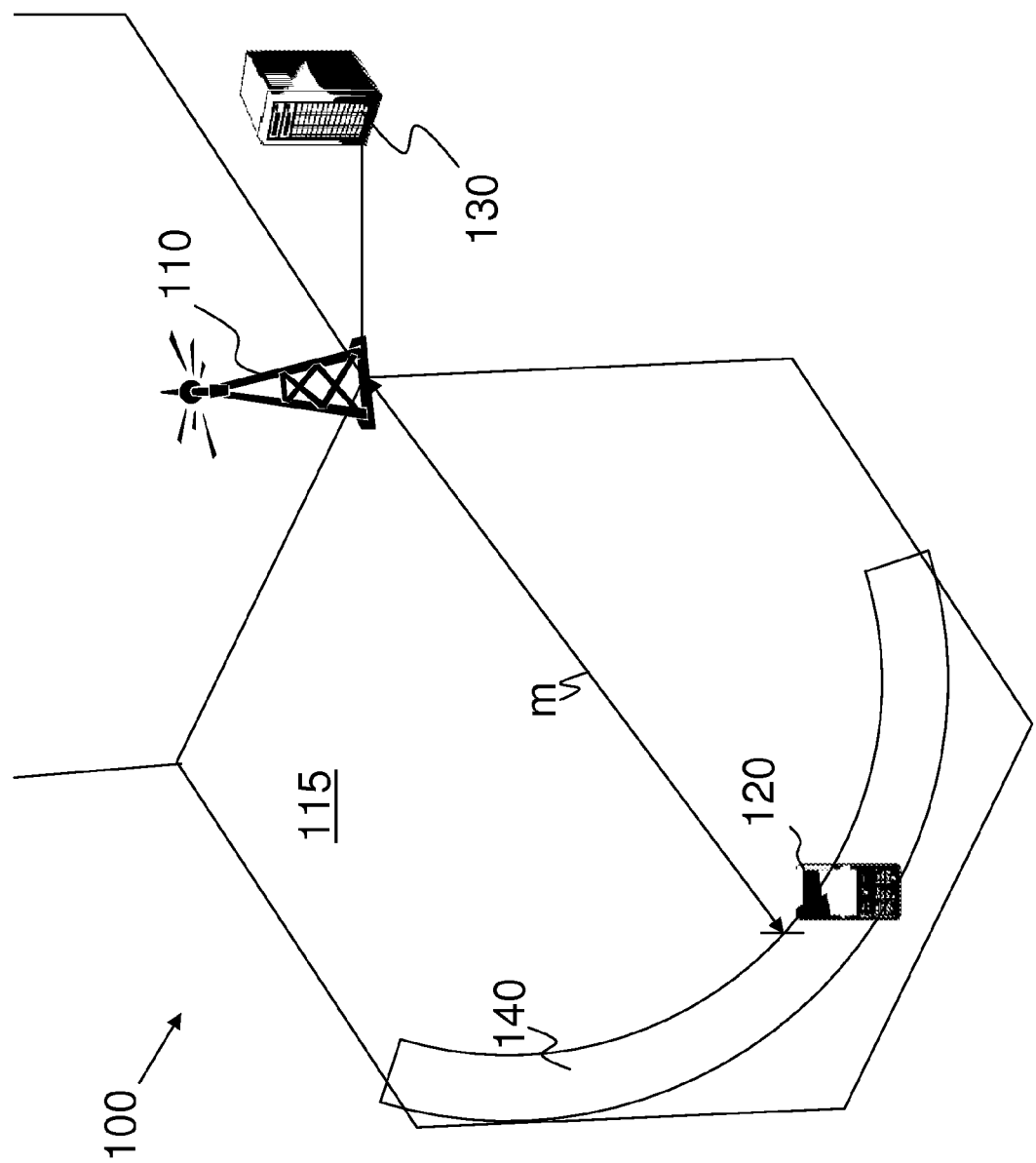
FIG. 9 shows an overview of positioning a UE using a Round Trip Time technique.

Positioning methods may be based on the radio cell 115 to which the UE 120 is attached, e.g. by using Cell-ID or combination of cell-ID and Timing Advance (TA)/Round Trip Time (RTT). The round trip time measurement principle is depicted in FIG. 9 in the radio telecommunications network 100.

Briefly, a travel time RTT of radio waves from the radio base station 110 to the UE 120 in the radio cell 115 and back is measured. A distance m from radio base station 110 to UE 120 then follows from the formula:

$$m = c \frac{RTT - UER \times TX}{2} \quad (3)$$

where RTT is the round trip time, UER×Tx is the latency between the downlink and the uplink as measured in the UE 120, and where c is the speed of light.

The round trip time measurement alone defines a circle, or if the inaccuracy is accounted for, a circular strip 140 around the radio base station 110. By combining this information with the radio cell polygon, the radio cell ID positioning data, left and right angles of the circular strip 140 can be computed. The position of the UE 120 is determined to be within the circular strip 140.

In several systems, among these the WCDMA system, Round Trip Time (RTT) can be used to identify the distance m from the radio base station 110 at which the UE 120 is positioned. This provides a distance that is not possible to ascertain where in the circular strip 140 the UE 120 is. If RTT measurements determine that the UE 120 is for example 500 m from the radio base station 110 this is along an arc in a sector or the circumference of a circle. Triangulation measurements of RTT from several base stations can be used to increase accuracy at the controller node 130. However, this possibility is limited by the fact that the UE 120 needs to be in handover with more than one base station for this to be possible, such as during a soft handover. This does only occur in a limited part of the radio cells, typically less than 25%. Hence, multi RTT measurements to determine position in WCDMA will not have a good availability.

Another approach is provided by so called fingerprinting positioning. Fingerprinting positioning algorithms operate by creating a radio fingerprint for each point of a fine coordinate grid that covers a Radio Access Network (RAN). The fingerprint may e.g. consist of
- Radio cell Ids that are detected by the UE 120, in each grid point.
- Quantized path loss or signal strength measurements, with regard to multiple radio base stations, performed by the UE 120, in each grid point. Note, an associated ID of the radio base station may also be needed to be included in the fingerprint.
- Quantized RTT, in each grid point. Note, an associated ID of the radio base station may also be needed to be included in the fingerprint.
- Radio connection information like a Radio Access Bearer (RAB).

Whenever a position request arrives to the positioning method, a radio fingerprint is first measured, after which the corresponding grid point is looked up and reported. This of course requires that the point is unique.

A database of fingerprinted positions, a so called radio map, may be generated in several ways. A first alternative would be to perform an extensive surveying operation that performs fingerprinting radio measurements repeatedly for all coordinate grid points of the RAN.

Another approach is to replace the fine grid by high precision position measurements of opportunity, and to provide fingerprinting radio measurements for said points. This approach needs to define algorithms for clustering of high precision position measurements of opportunity and for computation of geographical descriptions of the clusters.

The position of the UE 120 may be measured by any of the positioning methods described above, or other methods. The essence of these methods is that they determine a region or a point where the UE 120 is located. Again, the boundary of such regions can be described by a curve. Also the point can be described by such a curve r, using a single value for the parameter. Here, this curve is described by $$r = r_{UE}(s), \; s \in [s_0, s_1], \; r_{UE}(s_1) = r_{UE}(s_0). \quad (4)$$

Here s is the parameter of the curve.

The center of gravity of the region can also be used, this being denoted by $r_{CG,UE}$. In order to detect if the UE 120 is close, within a distance, to the radio cell boundary 127 a minimum distance $d^{min}$ between the radio cell boundary 127 of the radio cell 115 and one or both of
- the center of gravity (CG) of the UE position,
- any point on the region where the UE 120 is known to be located, is determined.

Mathematically, this is $$d^{min}_{cell,CG,UE} = \|r_{cell}(t^{min}_{cell,CG,UE}) - r_{CG,UE}\| \quad (5a)$$

$$t^{min}_{cell,CG,UE} = \operatorname*{argmin}_{t} \|r_{cell}(t) - r_{CG,UE}\|, \quad (5b)$$

For the center of gravity case, and $$d^{min}_{cell,UE} = \|r_{cell}(t^{min}_{cell,UE}) - r_{UE}(s^{min}_{cell,UE})\| \quad (6a)$$

$$(t^{min}_{cell,UE} \; s^{min}_{cell,UE}) = \operatorname*{argmin}_{t,s} \|r_{cell}(t) - r_{UE}(s)\|, \quad (6b)$$

for the case with a UE location region.

In the second step of the computation, the distance 125 between the position of the UE 120 and the radio cell boundary 127 is determined by a comparison of the radio cell radius to the minimum distance, calculated as above. Note that this strategy ensures that the UE 120 is treated as close to the radio cell boundary 127 whenever there is a possibility that this is the case.

In WCDMA, the position of the UE 120 is normally determined in the network node 130, such as the RNC, and the distance 125 to the radio cell boundary 127 for each user may be required to be signaled from the network node 130 to the radio base station 110. This is performed by means of new signaling functionality. For example:

- Signaling of the distance being within a distance range as a boolean flag, together with the ID of the UE 120 from network node 130 to radio base station 110 over Node B Application Part (NBAP) interface. NBAP comprises a signaling protocol responsible for the control of the radio base station 110 by the network node 130.
- Signaling of a minimum distance, information of radio cell size, together with the ID of the UE 120 from network node 130 to radio base station 110 over NBAP.
- Signaling of the minimum distance and the radio cell polygon description of the radio cell boundary 127, together with the ID of the UE 120 from network node 130 to radio base station 110 over NBAP.
- Signaling of the position of the UE 120 and the radio cell polygon description of the radio cell boundary 127, together with the ID of the UE 120 from network node 130 to radio base station 110 over NBAP.

Note that in the list above, more and more aspects of the computation of whether the distance 125 is within a distance range, indicating closeness, are performed in the radio base station 110.

The scheduling based on radio cell boundary closeness principles, using the information computed above, can be combined in many ways. A few embodiments include:

- Scheduling of Interference Cancellation (IC) capable receivers to UEs closest to the radio cell boundary 127, according to a sorted list of closeness
- Scheduling of IC capable receivers to UEs close enough to the radio cell boundary 127.
- Scheduling of IC capable receivers to UEs based on a combination of closeness to the radio cell boundary 127 and requested end-user rate.

An advantage of the technique comprises an improved performance of the WCDMA uplink, in terms of reduced dropped call rate, coverage and/or system throughput. The improvement being associated by accounting for the distance 125 of UE 120 to the radio cell boundary 127, thereby scheduling receivers with higher receiving sensitivity to UE 120 more in need of such receivers. This, since the UE 120 is not capable of further power ups at said radio cell boundary 127. It should be noted that the distance 125 to the radio cell boundary 127 may be indicated by the transmitted power of UE the 120.

In order to improve the receiving sensitivity of a receiver in the radio base station 110 the receiver may be capable of interference cancellation. There are a number of interference cancellation techniques, the most straightforward interference cancellation technique assumes that a number of interfering users have been decoded by their respective uplink receiver. This means that the following information is available in the uplink receiver pool of the uplink for such users:

- An estimated channel model.
- A decoded version of the transmitted symbol sequence.

Both these pieces of information are subject to estimation and detection errors, with some probability.

The basic idea of conventional interference cancellation is then that the available information allows for creation of a model signal of the interfering user. This model signal can in principle be generated at any receiver stage; it is however common to generate a transmitted chip sequence filtered with the estimated channel model. The transmitted chip sequence means that the symbols have been spread by multiplication by the much faster changing code(s) of the transmission of the interfering user.

Given the re-generated signal, this signal is then subtracted from a received signal of the user that is to be decoded, thereby reducing the level of interference. The subtraction can be performed in a variety of ways, ranging from direct hard subtraction to minimum mean squared subtraction accounting also for estimation uncertainties.

The above description was focused on the situation with a signal of one user being decoded and a signal of another user causing the interference. One way to generalize this concept to more than one interferer would be to perform the operations of re-generation and subtraction sequentially for all or a subset of the interferers. Another approach denoted multi-user detection (MUD) performs all operations simultaneously, by the definition of a large joint channel estimation/detection problem. This is however too computationally intensive to be applied in the radio cellular systems of today.

Another principle for interference cancellation recognizes that the interference cannot normally be modeled as white noise, neither in the temporal, channel model tap, domain, nor between antenna elements. GRAKE+ and chip equalizer receivers therefore build up a model of the interference followed by cancellation.

To provide some further insight into this, note again that the difference with GRAKE+ as compared to conventional RAKE, is that each user sees a reduced level of interference, immediately after the so called weight combining step. In GRAKE+, a covariance matrix $\hat{R}_u$, $u=1, \ldots, U$, with the order equal to the number of fingers is first estimated to capture the interference. The codes not used by the present user u may be used in order to estimate $\hat{R}_u$.

The GRAKE+ receiver uses the estimated covariance matrix that models the interference for computation of the combining weights for the users u, $u=1, \ldots, U$.

$$\hat{R}_u \hat{w}_u = \hat{h}_u, u=1, \ldots, U \qquad (7)$$

where $\hat{h}_u$, $u=1, \ldots U$, is the net channel response of user u and where $\hat{w}_u$ are the combining weights.

The effect of (7) is that GRAKE+ essentially whitens the correlated interference and removes large spectral peaks from interferers at certain finger locations and for certain antenna elements.

Note that GRAKE+ is still a linear receiver. There is a related type of IC receiver for WCDMA which is also linear, denoted the chip equalizer. The difference between GRAKE+ and the chip equalizer is simply the order of certain basic operations.

Figure 10:
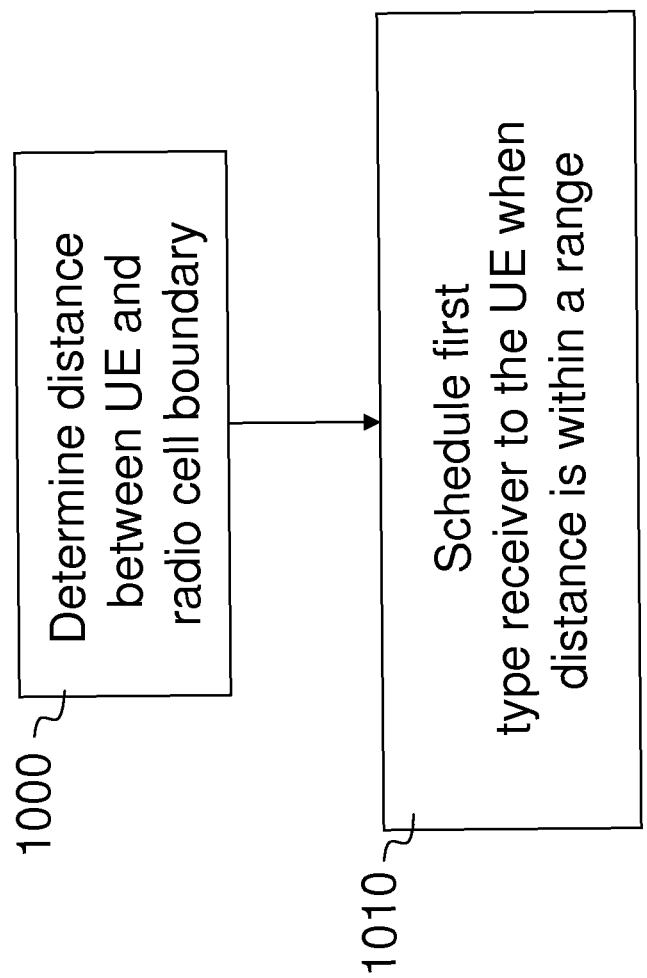
FIG. 10 shows a schematic overview of a flowchart of a method in a radio base station.

The method steps in the radio base station 110 for scheduling a first type of receiver to a UE within a radio cell 115 served by the radio base station 110 according to some general embodiments will now be described with reference to a flowchart depicted in FIG. 10. As mentioned above the radio base station 110, such as an EnodeB, or NodeB, comprises at least two different types of receivers; a first type of receivers and a second type of receivers. The first type of receivers comprises a receiver with a different receiving sensitivity to UEs than the second type of receivers. The receiver of the first type may comprise a higher receiving sensitivity to signals from UEs than a receiver of the second type. The method steps do not have to be taken in the order stated below, but may be taken in any suitable order.

In step 1000, the radio base station 110 determines the distance 125 between the UE 120 and the radio cell boundary 127 of the radio cell 115.

In step 1010, the radio base station 110 schedules a receiver of the first type of receivers to the UE 120 when the distance is determined to be within a distance range. For example, when it is determined that the UE 120 is within a distance close to the radio cell boundary a receiver with higher receiving sensitivity is scheduled to the UE 120.

This method implies an improved performance of the uplink, in terms of reduced dropped call rate, coverage and/or system throughput.

Figure 11:
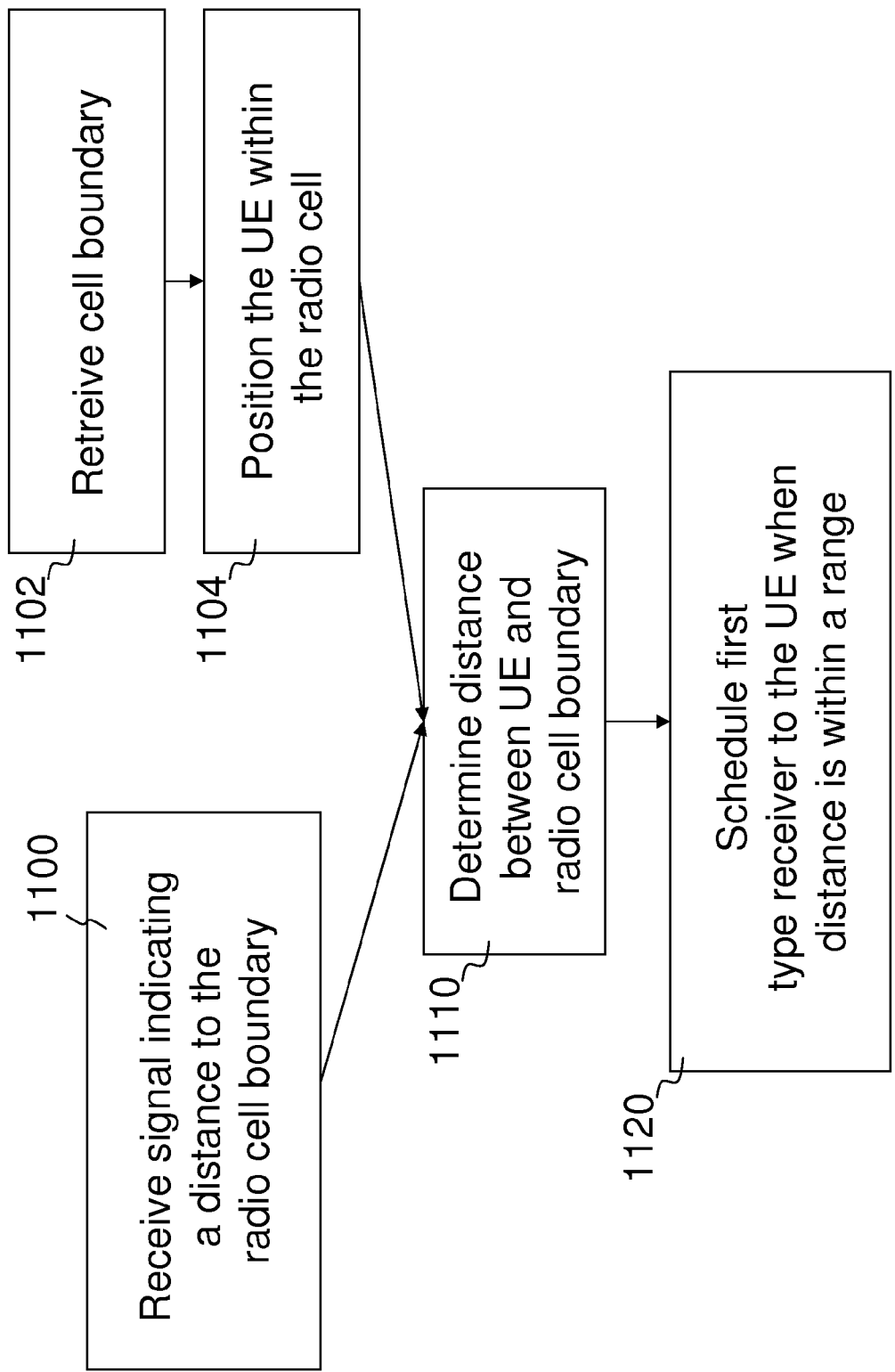
FIG. 11 shows a schematic overview of a flowchart of a method in a radio base station.

In FIG. 11, a method in the radio base station 110 according to some embodiments of the present solution is shown. The method steps do not have to be taken in the order stated below, but may be taken in any suitable order.

In step 1100, the radio base station 110 may receive a signal from the UE 120 indicating the distance between the UE and the radio cell boundary 127. The signal may comprise an indication of the transmitted power of the UE 120. For example, the UE 120 may transmit a delta power indicating how much more power the UE is able to transmit to reach its maximum power. Hence, the delta power indicates how close the UE 120 is to the radio cell boundary 127.

It should her be noted that the radio base station 110 may receive a signal comprising an indicator indicating distance to the radio cell boundary 127 together with an ID of the UE from a network node over a NBAP interface. The network node may comprise a radio network controller, a positioning node, a different radio base station and/or the like.

In some embodiments, the indicator comprises a boolean flag, a minimum distance, information of radio cell size, the radio cell polygon description of the radio cell boundary 127 and/or position of the UE 120. The Boolean flag may just indicate whether the UE 120 is within the distance range or not.

The radio base station 110 may, as disclosed in step 1102, retrieve a location of the radio cell boundary 127. The radio cell boundary 127 may be received externally or input internally.

In step 1104, the radio base station 110 may position the UE 120 within the radio cell 115. This may be done using received information and/or information stored internally of the radio base station 110. There are a number of ways to position the UE 120 as described above and any of these and other methods may be performed to position the UE 120.

In step 1110, the radio base station determines a distance 125 between the UE 120 and a radio cell boundary 127 of the radio cell 115. The step 1110 in FIG. 11 corresponds to step 1000 in FIG. 10.

In step 1115, a second user equipment 128 is comprised within the radio cell 115 and positioned a distance 129 from the radio cell boundary 127. Then the radio base station 110 may sort the user equipment 120 and the second user equipment 128 in a list. The list may be based on the distances 125, 129 between respective user equipment 120, 128 and the radio cell boundary 127. The distance range may then be based on the list and the number of first type receivers available in the radio base station 110.

For example, the radio base station 110 sorts distances between different served UEs in the radio cell. The UEs are ranked in the cell based on the shortest distance to the radio cell boundary 127.

In step 1120, the radio base station 110 schedules the first type of receiver to the UE 120 when the distance 125 is determined to be within a distance range. The distance indicates the position of the UE 120 relative the radio cell boundary 127. The step 1120 in FIG. 11 corresponds to step 1010 in FIG. 8.

The first type of receiver comprises an interference cancellation function and thereby comprises a higher receiving sensitivity to UEs. For example, the first type of receivers comprises a GRAKE+ receiver or a chip equalizer and the second type of receivers comprises a RAKE or a GRAKE receiver.

The scheduling of the receiver of the first type of receivers may be based on; a sorted list of closeness of UE and/or UEs within a preset distance range to the radio cell boundary 127.

The distance range may comprise a predetermined distance to the radio cell boundary 127. A priority of UEs with a requested high end data rate may be used in combination to the distance between the UE 120 and the radio cell boundary 127.

It should here be understood that the receiver of the first type of receivers may instead comprise a lower receiving sensitivity than the receiver of the second type of receivers. Then UEs being farthest from the radio cell boundary 127 may be scheduled to the first type of receivers.

Hence, the presented solution enables an efficient manner of schedule radio resources within a radio telecommunications network.

Figure 12:
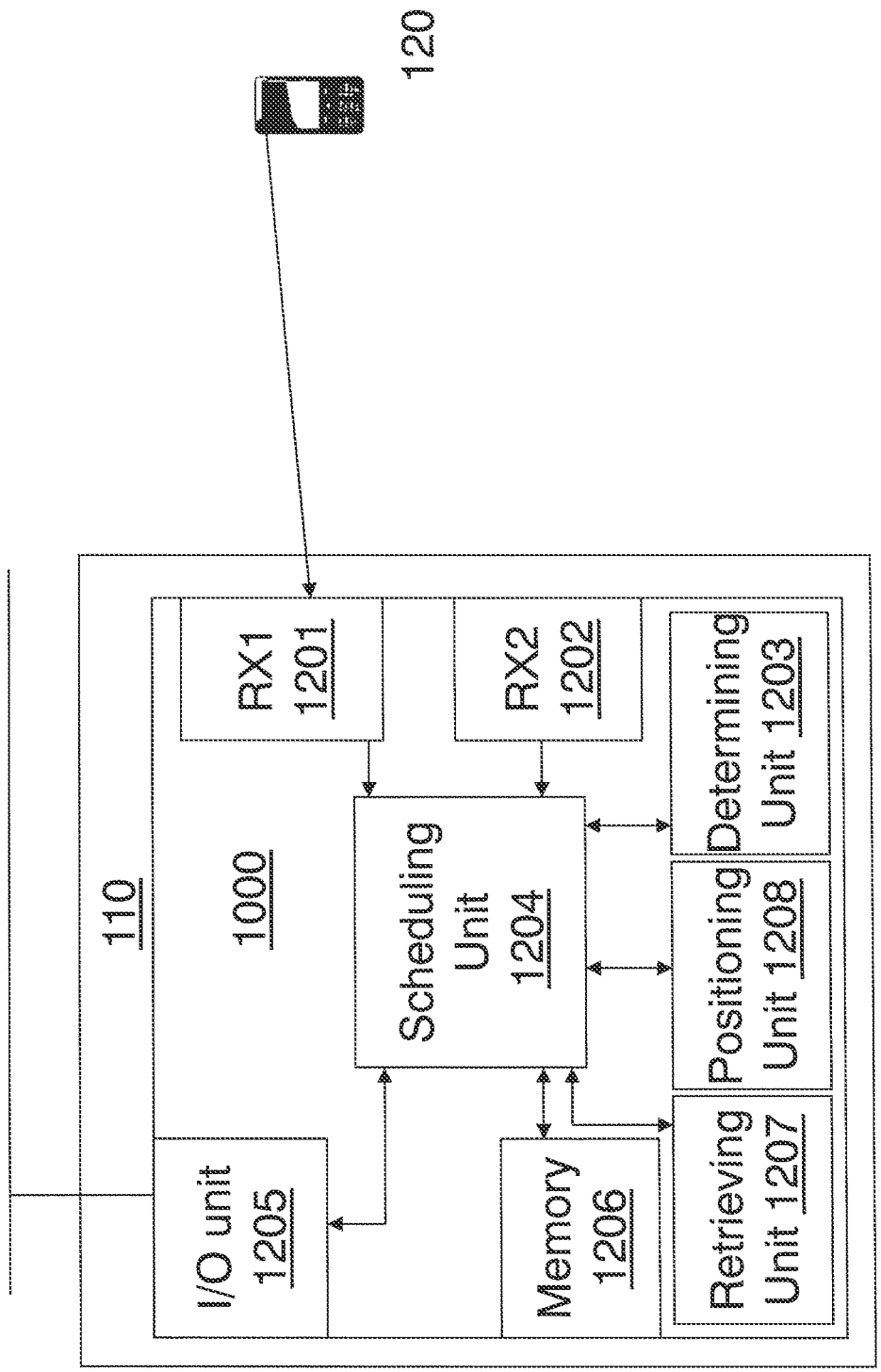
FIG. 12 shows a schematic overview of a radio base station comprising an arrangement.

To perform the method steps above for scheduling a first type of receiver to a UE within the radio cell 115 served by the radio base station 110, the radio base station 110 comprises an arrangement 1200 depicted in FIG. 12.

The arrangement 1200 comprises at least two different types of receivers; a first type of receivers (RX1) 1201 and a second type of receivers (RX2) 1202. The first type of receivers comprises a receiver with a different receiving sensitivity than the first type of receivers 1201. The receiver of the first type of receivers may comprise an interference cancellation function to the receiver of the first type of receivers, thereby achieving a higher receiving sensitivity. The arrangement 1200 may further comprise a determining unit 1203 arranged to determine a distance 125 between the UE 120 and the radio cell boundary 127 of the radio cell 115 served by the radio base station 110. Furthermore, the arrangement 1200 comprises a scheduling unit 1204 arranged to schedule a first type of receiver to the UE 120 when the distance 125 is within a distance range.

The network node arrangement 1200 may further comprise a network interface unit (I/O) 1205 arranged to receive signals indicating a distance between the UE 120 and the radio cell boundary 127.

The arrangement 1200 may further comprise a memory unit 1206 to be used to store data regarding positions, radio cell boundaries, and applications to perform the methods of this solution.

The memory unit 1206 may comprise a single memory unit, a plurality of memory units, external and/or internal memory units.

The arrangement 1200 may further comprise a retrieving unit 1207 arranged to retrieve the location of the radio cell boundary 127, and a positioning unit 1208 arranged to position the UE 120. Then the determining unit 1203 may determine distance between the position of the UE 120 and the radio cell boundary 127.

The determining unit 1203, the scheduling unit 1204, the retrieving unit 1207, the positioning unit 1208 may be parts of one or more processing unit.

Figure 13:
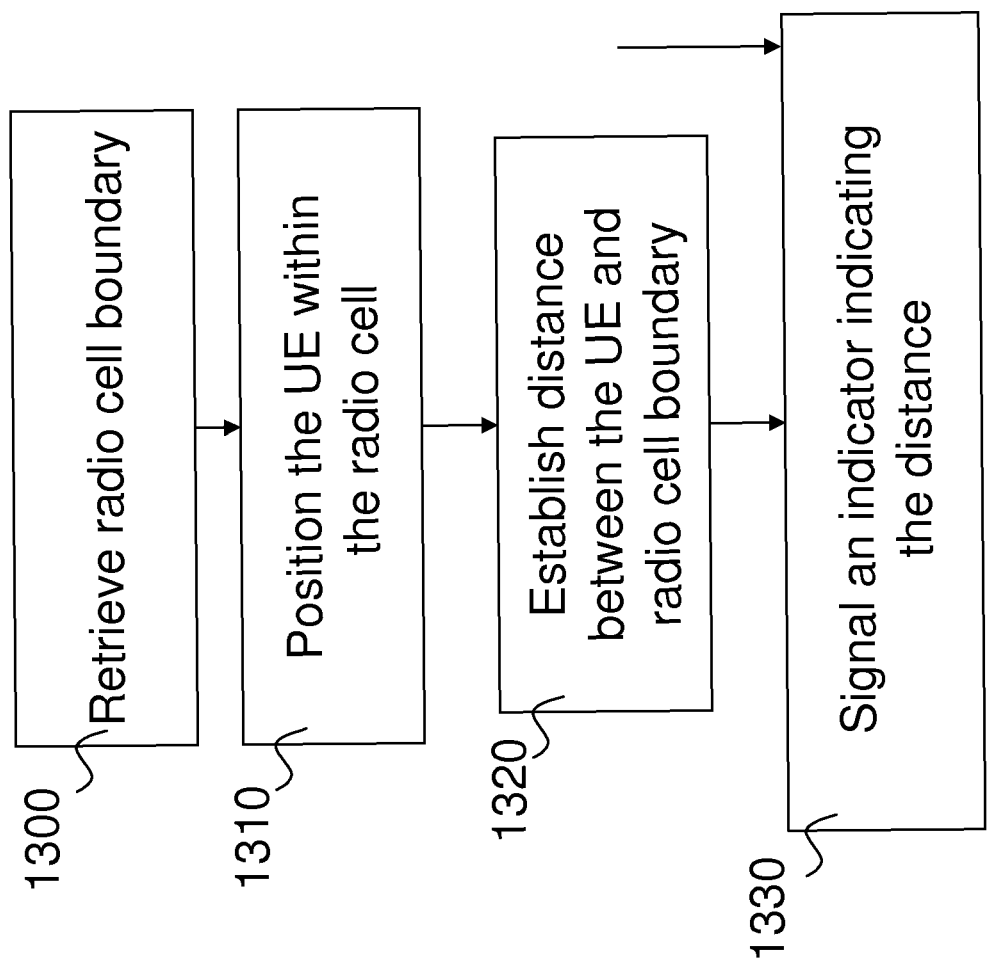
FIG. 13 shows a schematic overview of a flowchart of a method in the network node.

In FIG. 13, a general embodiment of the present solution is disclosed as a flowchart of a method in the network node 130. The method is for signaling to the radio base station 110 an indicator indicating a distance between the user equipment 120 and a radio cell boundary 127 of the radio cell 115 served by the radio base station 110.

The network node 130 may comprise a radio network controller, a positioning node, a different radio base station, and/or the like. The radio base station 110 is arranged to be connected to the network node 130, and comprises at least two different types of receivers; a first type of receivers and a second type of receivers. The first type of receivers comprises a receiver with different receiving sensitivity than the second type of receivers. The distance is to be used when scheduling a receiver of the first type of receivers to the user equipment 120. The method steps do not have to be taken in the order stated below, but may be taken in any suitable order. In some embodiments, the first type of receiver comprises a interference cancellation function thereby achieving a higher receiving sensitivity.

In optional step 1300, the network node 130 retrieves the radio cell boundary 127 of the radio cell 115.

In optional step 1310, the network node 130 positions the UE 120 within the radio cell 115.

In optional step 1320, the network node 130 establishes the distance 125 between the position of the UE 120 and the radio cell boundary 127 using the retrieved radio cell boundary 127 and the position of the UE 120.

In step 1330, the network node 130 signals the indicator and an identity of the UE 120 to the radio base station 110. In some embodiments, the signal is received over a NBAP interface or an X2 interface and/or the like. This may be the first step if optional steps 1300, 1310, 1320 are not performed.

The indicator may in some embodiments comprise a boolean flag, a minimum distance, information of radio cell size, the radio cell polygon description of the radio cell boundary 127, and/or position of the user equipment 120.

Hence, the presented solution enables an efficient manner of schedule radio resources within a radio telecommunications network.

Figure 14:
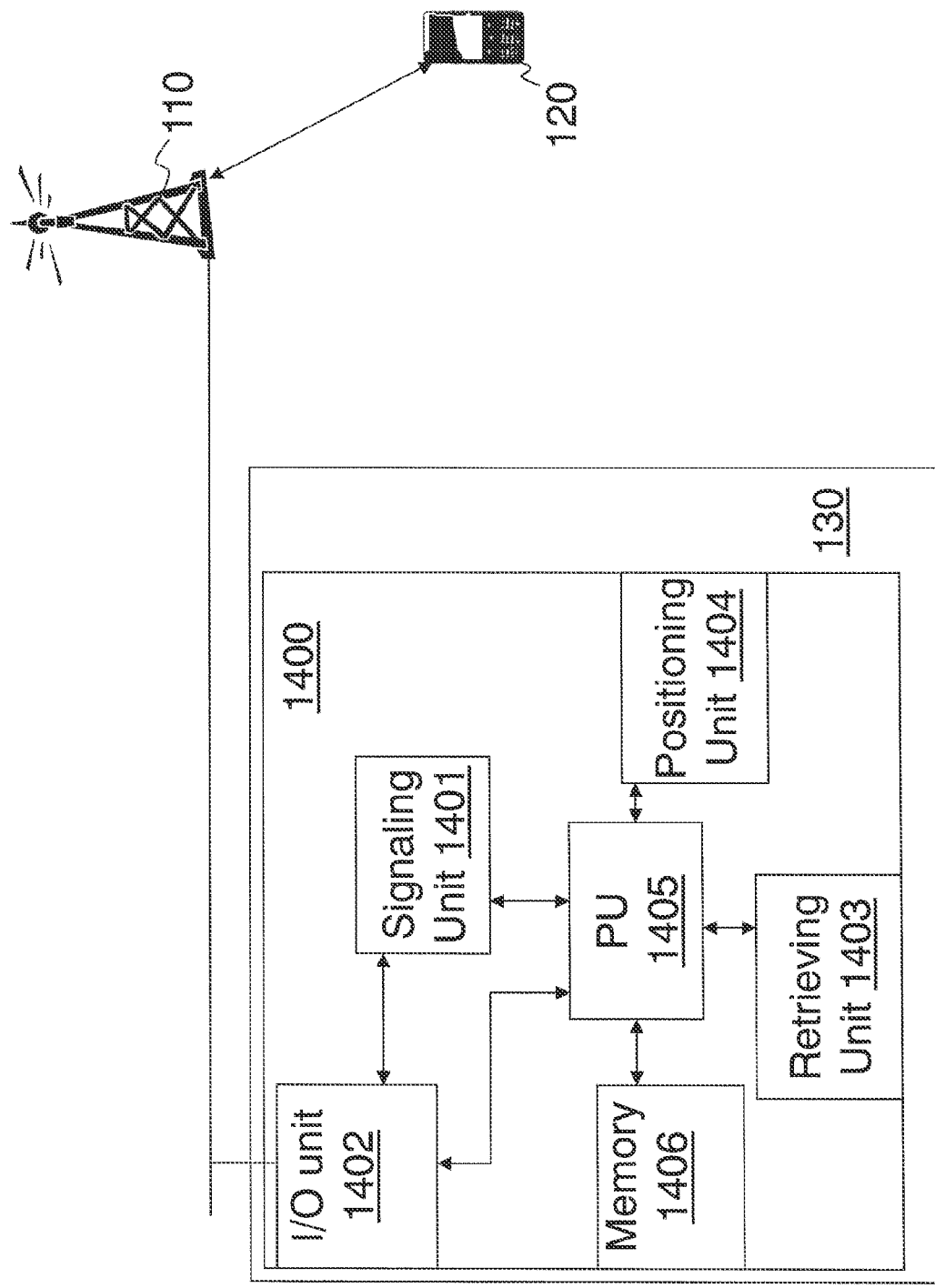
FIG. 14 shows a schematic overview of the network node comprising an arrangement.

To perform the method steps above an arrangement 1400 in the network node 130 is provided depicted in FIG. 14. The network node 130 may, as stated above, comprise a radio controller node, an eNodeB, a positioning node, and/or the like The arrangement 1400 comprises a signalling unit 1401 arranged to signal to the radio base station 110 over a network interface unit 1402, an indicator indicating a distance between the UE 120 and a radio cell boundary 127 of the radio cell 115 served by the radio base station 110 and an identity of the UE 120. The distance is to be used when scheduling the receiver of the first type of receivers to the user equipment 120 in the radio base station 110

The arrangement 1400 in the network node 130 may further comprise a retrieving unit 1403 arranged to retrieve a location of the radio cell boundary 127 of the radio cell 115. Additionally, the arrangement 1400 may further comprise a positioning unit 1404 arranged to position the UE 120 within the radio cell 115. Furthermore, the arrangement 1400 may comprise a processing unit (PU) 1405 arranged to determine the distance between the position of the UE 120 and the radio cell boundary 127 using the retrieved radio cell boundary 127 and the position of the UE 120.

The arrangement 1400 may further comprise a memory unit 1406 to be used to store data regarding, for example, positions, location of the radio cell boundary 127, and applications to perform the methods of this solution.

The memory unit 1406 may comprise a single memory unit, a plurality of memory units, external and/or internal memory units.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a radio base station for scheduling a receiver of a first type to a user equipment within a radio cell served by the radio base station, wherein the radio base station comprises at least two different types of receivers that include the first type of receiver and a second type of receiver, the first type of receiver comprising a receiver with a different receiving sensitivity than a receiver of the second type, wherein the first type of receiver is operated for a range of distances between the user equipment and a radio cell boundary of the radio cell, and wherein the second type of receiver is operated for distances between the user equipment and the radio cell boundary that are outside said range of distances, the method comprising:
    determining, by one or more processing units of the radio base station, a distance between the user equipment and the radio cell boundary of the radio cell; and
    scheduling, by the one or more processing units of the radio base station, the receiver of the first type to the user equipment when the distance is determined to be within the range of distances.

2. The method according to claim 1, wherein said first type of receiver comprises a receiver with higher receiving sensitivity by being configured to perform an interference cancellation function.

3. The method according to claim 1, wherein said first type of receiver comprises a GRAKE+ receiver or a chip sequencer and the second type of receiver comprises a RAKE or a GRAKE receiver.

4. The method according to claim 1, further comprising receiving a signal from the user equipment indicating the distance between the user equipment and the radio cell boundary.

5. The method according to claim 4, wherein said signal comprises an indication of the transmitted power of the user equipment.

6. The method according to claim 1, further comprising:
    retrieving location of the radio cell boundary, and
    positioning the user equipment within the radio cell, wherein the step of determining the distance is based on the retrieved location of the radio cell boundary and the positioned user equipment.

7. The method according to claim 1, further comprising:
    receiving a signal from a network node over an interface, wherein the signal comprises an indicator indicating distance to the radio cell boundary together with an ID of the user equipment.

8. The method according to claim 7, wherein the indicator comprises one or more of a boolean flag, a minimum distance, information of radio cell size, the radio cell polygon description of the radio cell boundary, and position of the user equipment.

9. The method according to claim 1, wherein
    a second user equipment is within the radio cell and the second user equipment is positioned at a distance from the radio cell boundary, and the method further comprises sorting the user equipment and the second user equipment in a list based on the distances between respective user equipment and the radio cell boundary, and wherein the distance range is based on the list and the number of first type receivers available in the radio base station.

10. The method according to claim 1, wherein the distance range comprises a predetermined distance to the radio cell boundary.

11. An arrangement in a radio base station serving a radio cell, comprising:
at least two different types of receivers that include a first type and a second type, wherein the first type comprises a receiver with different receiving sensitivity than a receiver of the second type, wherein the first type of receiver is operated for a range of distances between a user equipment and a radio cell boundary of the radio cell, and wherein the second type of receiver is operated for distances between the user equipment and the radio cell boundary that are outside said range of distances;
a determining unit arranged to determine a distance between the user equipment and the radio cell boundary of the radio cell; and
a scheduling unit arranged to schedule the receiver of the first type to the user equipment when the distance is within the range of distances.

12. A method in a network node for assisting a radio base station in scheduling a receiver of a first type to a user equipment, the method comprising:
signaling, to the radio base station, an indicator indicating a distance between the user equipment and a radio cell boundary of a radio cell served by the radio base station, and an identity of the user equipment, wherein
the radio base station comprises at least two different types of receivers that include a first type and a second type, wherein the first type comprises a receiver with a different receiving sensitivity than a receiver of the second type, wherein the first type of receiver is operated for a range of distances between the user equipment and the radio cell boundary of the radio cell, and wherein the second type of receiver is operated for distances between the user equipment and the radio cell boundary that are outside said range of distances.

13. The method according to claim 12, further comprising retrieving a location of the radio cell boundary of the radio cell,
positioning the user equipment within the radio cell, and
establishing the distance between the user equipment and the radio cell boundary based on the retrieved location of the radio cell boundary and the position of the user equipment.

14. The method according to claim 12, wherein the signaling is performed over a Node B Application Part interface or X2 interface.

15. The method according to claim 12, wherein the indicator comprises one or more of a boolean flag, a minimum distance, information of radio cell size, the radio cell polygon description of the radio cell boundary and position of the user equipment.

16. An arrangement in a network node comprising:
a signaling unit arranged to signal an indicator indicating a distance between a user equipment and a radio cell boundary of a radio cell served by a radio base station and an identity of the user equipment to the radio base station; and
a network interface unit arranged to communicate the indication and the identity to the radio base station,
wherein the radio base station comprises at least two different types of receivers that include a first type of receiver and a second type of receiver, wherein the first type of receiver comprises a receiver with a different receiving sensitivity than a receiver of the second type of receiver, wherein the first type of receiver is operated for a range of distances between the user equipment and the radio cell boundary of the radio cell, and wherein the second type of receiver is operated for distances between the user equipment and the radio cell boundary that are outside said range of distances.

* * * * *

UNITED STATES PATENT AND TRADEMARK OFFICE
CERTIFICATE OF CORRECTION

PATENT NO.       : 8,743,839 B2  
APPLICATION NO.  : 13/379474  
DATED            : June 3, 2014  
INVENTOR(S)      : Karlsson et al.

Page 1 of 1

It is certified that error appears in the above-identified patent and that said Letters Patent is hereby corrected as shown below:

On the Title Page, Item (75), under "Inventors", in Column 1, Line 2, delete "Torbjorn Wigren," and insert -- Torbjörn Wigren, --, therefor.

In the Specification

In Column 8, Line 30, delete "$\Delta P_M$" and insert -- $\Delta P_u$ --, therefor.

In Column 13, Line 29, delete "her" and insert -- here --, therefor.

Signed and Sealed this  
Ninth Day of September, 2014

Michelle K. Lee  
*Deputy Director of the United States Patent and Trademark Office*